May 16, 1961 P. J. WEAVER 2,984,073
MACHINE TOOL CONTROL CIRCUIT
Filed Oct. 5, 1959 3 Sheets-Sheet 3

INVENTOR.
PAUL J. WEAVER
BY Angus & Mon
ATTORNEYS.

United States Patent Office 2,984,073
Patented May 16, 1961

2,984,073
MACHINE TOOL CONTROL CIRCUIT

Paul J. Weaver, Downey, Calif., assignor, by mesne assignments, to Banstrom Industries, Inc., Los Angeles, Calif., a corporation of Connecticut Filed Oct. 5, 1959, Ser. No. 844,327

10 Claims. (Cl. 60—97)

This invention relates to a machine tool control.

An object of this invention is to provide a control adaptable to machine tools such as a mill, wherein a workpiece is to be moved along a pair of oblique axes, by means of which control the tool can be operated both under tracer control, and under manual control (power feed) for conventional milling. A related object is to provide such a control which permits an easy switch-over between tracer and manual control.

A further object of the invention is to provide a control whose actuating members, such as knobs and handles, can be located remote from the operator.

Still another object of the invention is to provide a manually operable tool which is able to utilize hydraulic motors for both tracer-controlled and conventional milling operations.

Still another object of the invention is to provide a control which enables the modes of milling to be switched between axes when the device is under tracer control. For example, in one embodiment of the invention, the machine is adapted to have tracer-regulated movement along one of its axes as a first mode, and a velocity-coordinated feed movement occurs on its other axis as a second mode. This control enables these modes to be switched from axis to axis, and also allows the direction of feed to be selected.

This invention is carried out in combination with a machine tool such as a mill, which has two relatively movable machine tool members which are movable along obliquely oriented axes. As a single example, which will be used throughout this specification, a commonly known type of mill has a worktable mounted by a pair of perpendicularly oriented ways located on a knee. The knee moves the table up and down, and a motor is provided for moving the table along at least one axis, say right and left. Either a screw or a motor is usually provided for moving the table along the axis as well, although this invention relates to the control of only two axes.

According to a preferred but optional feature of the invention, quick traverse means are supplied for enabling the machine to be moved rapidly while under manual control.

According to still another preferred but optional feature of the invention, the machine is provided with a feed range control whereby for a given tracer stylus deflection, the rate of movement of the machine tool may be rendered higher or lower.

According to still another preferred but optional embodiment of the invention, a feed rate regulator is provided which regulates the rate of movement of the machine tool for a given stylus deflection within a given range determined initially by the feed range control.

The above and other features of this invention will be fully understood from the following detailed description and the accompanying drawings, in which:

Fig. 4 is a side view, partly in cutaway cross-section, of a tracer valve useful in this invention;

Fig. 5 is a cross-section taken at line 5—5 of Fig. 4;

Fig. 6 is a cross-section taken at line 5—5 of Fig. 4; and

Fig. 7 is a top view taken at line 7—7 of Fig. 4.

Figure 1:
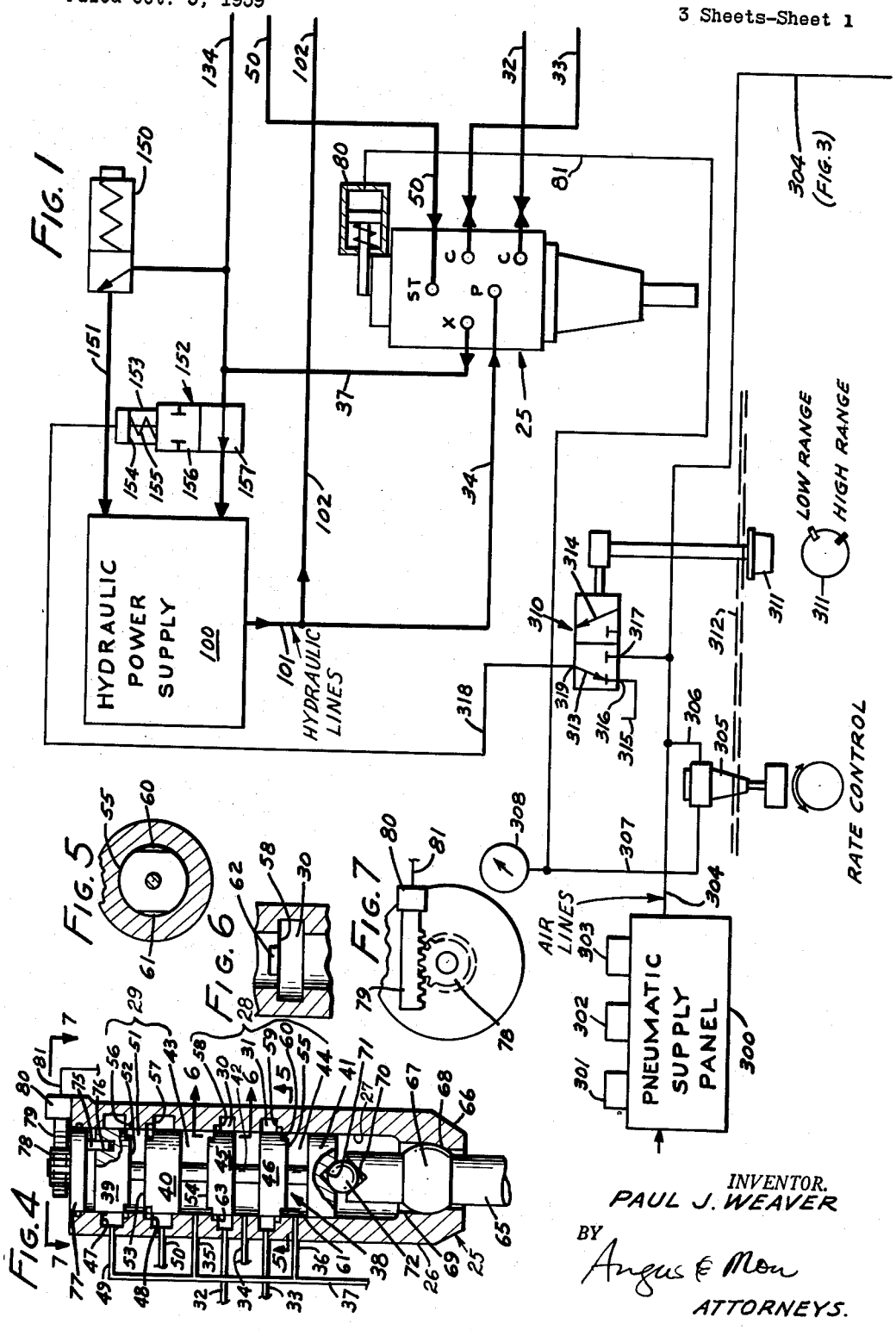
Fig. 1 is a circuit drawing of a portion of a control according to the invention.

This invention comprises a machine tool control that is adapted to control movements of a milling machine. Because the milling machine is completely conventional, it will not be disclosed in detail. A milling machine of the general type with which this control is particularly useful is more fully disclosed in applicant's copending United States patent application, Serial No. 748,426, filed July 14, 1958, entitled, "Pattern Controlled Machine Tool."

The purpose of the control is to regulate application of motive fluid to a pair of motors 20, 21. For convenience in disclosure, motor 20 will be referred to as a vertical axis motor, and motor 21 will be referred to as a horizontal axis motor, and throughout the drawings and description, the controls will be labeled "up-down," and "right-left" to make the disclosure more comprehensible. It will be understood, however, that this control is adaptable to the control of other axes, for instance, motor 20 might instead be placed on a horizontal axis normal to that of motor 21, or one axis might be a twist-controlled axis.

The motors are schematically illustrated as piston and cylinder combinations wherein motor fluid applied thereto will shift the piston and its rod relative to the cylinder in an amount proportional to the volume of fluid supplied thereto by the control. In accordance with standard construction, a feed normal to the horizontal axis controlled by motor 21 would ordinarily be provided, such as by a screw or another motor, for pickfeed adjustments.

The function of the present control is to govern the operation of a machine tool in a plane defined by two axes in which motors 20 and 21 are respectively effective in moving a workpiece attached to the worktable. In common milling practice, a milling spindle is attached to the frame of the machine, such as by pedestal, so that movement of the worktable relative to the pedestal causes a milling cutter turned by the spindle to cut in the surface of a workpiece a desired contour. A tracer valve 25, which is shown in full detail in Fig. 4, and also in said patent application, Serial No. 748,426, is attached to the pedestal where it traces over a pattern carried by the worktable, when the device is operating under tracer control.

While the control of this invention is adapted for many types of standard tracer operations, it is particularly adapted to usage along with a tracer valve of the type disclosed in applicant's aforesaid patent application, wherein the tracer valve controls both tracer movement along one axis, and the rate of feed movement along the other axis. For example, in a die sinking operation the vertical axis controlled by motor 21 might be under tracer control for reversible up and down movement, while the horizontal axis motor may be set for a unidirectional feed movement, the rate of feed being inversely proportional to the rate of movement along the feed axis.

A brief description of such a tracer valve will be given here. For a more complete description, reference may be had to the said patent application. The tracer valve 25 has a tracer body 26 with a central circular cylindrical spool passage 27 therein. The valve includes a tracer control sector 28 that is a four-way valve, and a feed rate control sector 29 that is a valve which cuts down flow therethrough whenever its spool is moved in either direction from a center position.

The passage in the tracer sector includes a pair of motor supply grooves 30, 31 which are spaced from each other, and which are connected to motor supply conduits 32, 33, which are intended to be ultimately connected to opposite sides of whichever motor is under tracer control. A pressure conduit 34 connects with the spool passage between the motor supply grooves, while a pair of exhaust conduits 35, 36 connect with said spool passage on opposite sides of a pair of motor supply grooves, and are joined to an exhaust manifold 37. A valve spool 38 has three sealing lands 39, 40, 41. Between sealing lands 40 and 41 the spool has a pressure groove 42, and on opposite sides of the pressure groove there are exhaust grooves 43, 44. The pressure groove is separated from the exhaust grooves by control lands 45, 46. Within the limits of the valve's operation, pressure groove 42 remains in fluid communication with pressure conduit 34, and exhaust grooves 43, 44 remain in communication with exhaust conduits 35, 36.

In the feed rate control sector, the spool passage has a pair of spaced grooves 47, 48. Groove 47 is connected by exhaust conduit 49 to exhaust manifold 37, while groove 48 is connected to a motor conduit 50. Motor 50 is intended to be connected to the exhaust side of the motor under feed-regulated control, when one of the motors is under tracer control.

Between lands 39 and 40, the spool has a groove 51, which is bounded by control edges 52, 53. On their farthest sides from the pressure groove, control lands 45 and 46 are bounded by control edges 54 and 55, respectively.

Sleeve grooves 47, 48, 30, and 31 are respectively provided with control edges 56, 57, 58, 59 which are adapted to be at least partially overlapped by respective control edges 52, 53, 54, and 55.

The details of one of these control edges are shown in Figs. 5 and 6. In Fig. 5, the control edge 55 of the spool is shown in detail. Notches 60 and 61 are milled across this edge to provide an offset portion therein which extends for less than the full periphery of the spool.

In Fig. 6, an elevation shows motor supply groove 30 and its control edge 58. A notch 62 has been formed in edge 58, providing an offset in the control edge, and a similar notch 63 is formed in the opposite side of that edge. Notches 60, 61, 62, and 63 subtend the same arc around the periphery of their respective members. Rotation of the spool in the sleeve brings these notches into and out of registration in adjustable amounts, such that the overlap of the notches is a function both of the rotary position of the spool in the sleeve and of its axial location therein.

The other cited control edges have similar notches, and they are similarly constructed. The purpose of these notches is to provide initial point of overlap of the edges such that for a given axial displacement of the spool, the flow past the control edges may be made a function of the rotary position of the spool in the sleeve. This frees the tracer valve from total dependence on the amount of stylus deflection for determining the rate of movement of the machine tool.

Axial movement of the spool is accomplished by a stylus 65. The stylus projects from the nose 66 of the valve, and is mounted therein by means of a ball-like member 67. The ball-like member is adapted to be restrained at the lower extreme of its movement by seat 68, and is able to move up and down in a cylindrical base 69, the walls of which closely embrace the ball that enables it to move up and down within the limits defined by the seat. The stylus has in its upper surface a conical depression 70 which matches a depression 71 in the bottom of the spool. A ball 72 fits in both depressions so as to convert both lateral and vertical movements of the stylus, or any combination thereof, into an up or down movement of the spool.

The rotary orientation of the spool is accomplished by a rate control mechanism which includes a tang 75 projecting into a slot 76 in the top of the spool. The tang depends from a rotary plug 77, the plug bearing a pinion 78. The pinion is engaged by a rack 79, this rack being moved back and forth by a pressure-responsive fluid motor 80, whose position is determined by the pressure in a conduit 81 connected thereto (see Fig. 7). This motor may be such as a piston opposed by a spring, wherein a given pressure on the piston works a given compression of the spring and a resultant movement of the rack.

In the rate control section, spool groove 51 overlaps both of sleeve grooves 47 and 48 when the spool is in the central position illustrated. Then fluid can pass from conduit 50 through conduit 49 at a maximum rate. When the spool is shifted from its central position, flow from conduit 50 through conduit 49 is cut down, or even stopped, because the overlap at one side or the other of groove 51 is cut down or eliminated. Therefore, fluid flow passed by section 29 of the tracer valve is at a rate inverse to the rate of movement of the motor passed by tracer section 28.

The purpose of the control is to provide means for selecting which axis is to be under control of sectors 28 and 29, and the direction of feed movement when the operation is to be "automatic," in the sense of being automatically fed and tracer controlled. The control also provides for an optional manual operation of the machine as a conventional mill, wherein the motors can be selectively operated without reference to the tracer valve.

Figure 2:
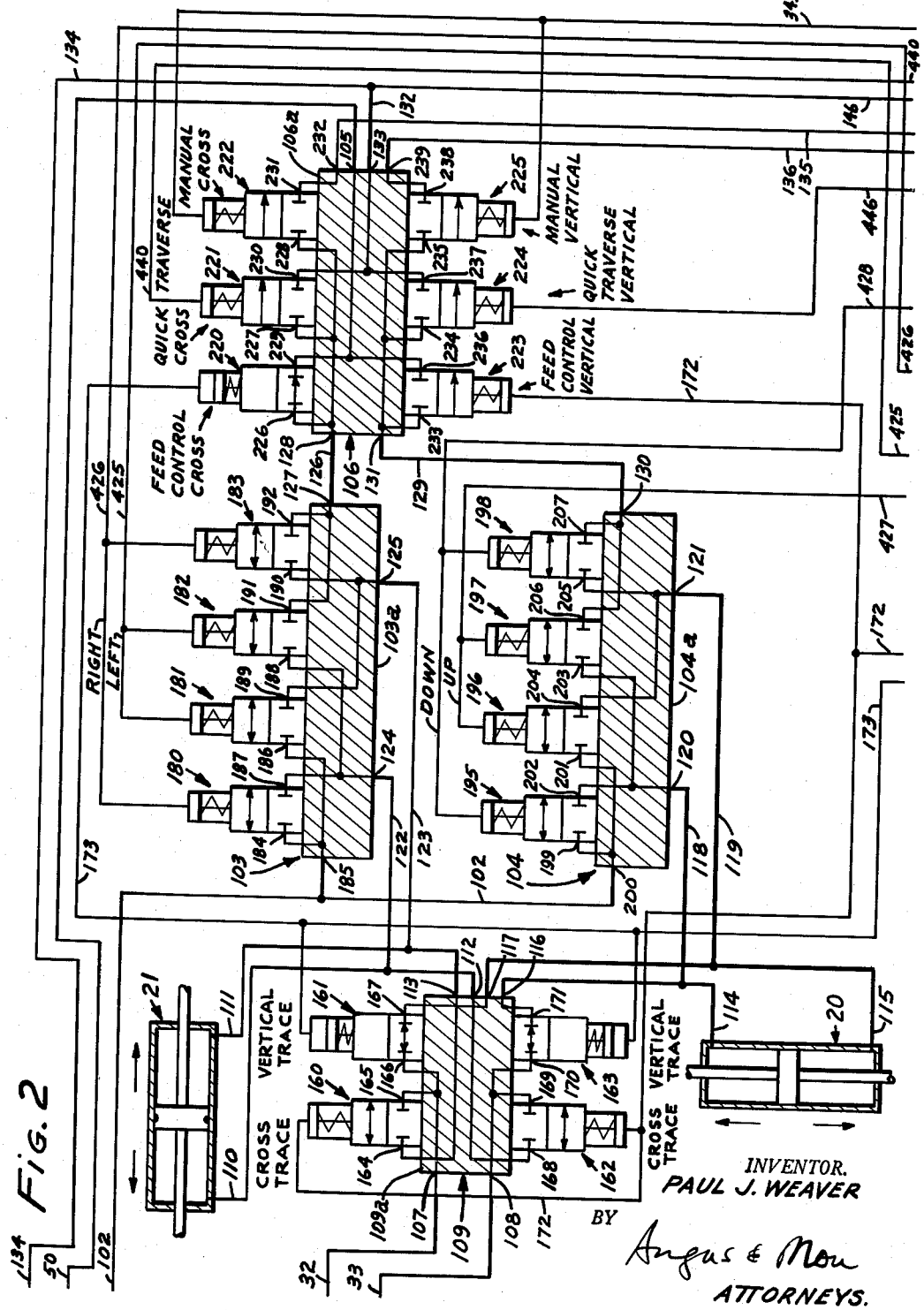
Fig. 2 is a similar drawing having its left end adapted to join to the right end of Fig. 1.

The control will now be described in detail with initial reference to that portion which is shown in Fig. 1. Tracer valve 25 is the primary hydraulic control on the device when it is automatic operation. The hydraulic connections, which supply power to the motors, will be described first. The conduits in the figures are primarily shown in two shadings. Th heavier lines represent conduits carrying hydraulic fluid, and the lighter lines represent conduits carrying compressed air. A conventional hydraulic power supply 100 incorporates a reservoir, pump, and strainer, and has an output conduit 101 which branches to pressure conduit 34 and to supply conduit 102. Supply conduit 102 connects to direction selection valves 103, 104 (Fig. 2). These valves have manifolds 103a, 104a, respectively.

Motor conduits 50 (Fig. 1) from the tracer valve connects to outlet 105 of a mode selection valve 106, which has a manifold 106a (Fig. 2). Cylinder supply conduits 32 and 33 (Fig. 1) respectively connect to ports 107, 108 of a tracer axis selection and lockout valve 109, which has a manifold 109a (Fig. 2).

Conduits 110, 111 (Fig. 2) interconnect opposite sides of horizontal axis motor 21 to ports 112 and 113, while conduits 114 and 115 of motor 20 connect the opposite ends of vertical axis motor 20 to ports 116, 117, respectively, on manifold 109a.

Conduits 114 and 115 have branches 118 and 119, which respectively connect with ports 120 and 121 of manifold 104a. Similarly, conduits 110 and 111 have branches 122 and 123 which respectively connect to ports 124 and 125 of manifold 103a.

Conduit 126 connects port 127 of manifold 103a with port 128 of manifold 106a. Conduit 129 interconnects port 130 of manifold 104a to port 131 of manifold 106a.

Conduit 132 interconnects port 133 of manifold 106a to an exhaust manifold 134. Exhaust manifold 134 connects to exhaust manifold 37 in Fig. 1.

Figure 3:
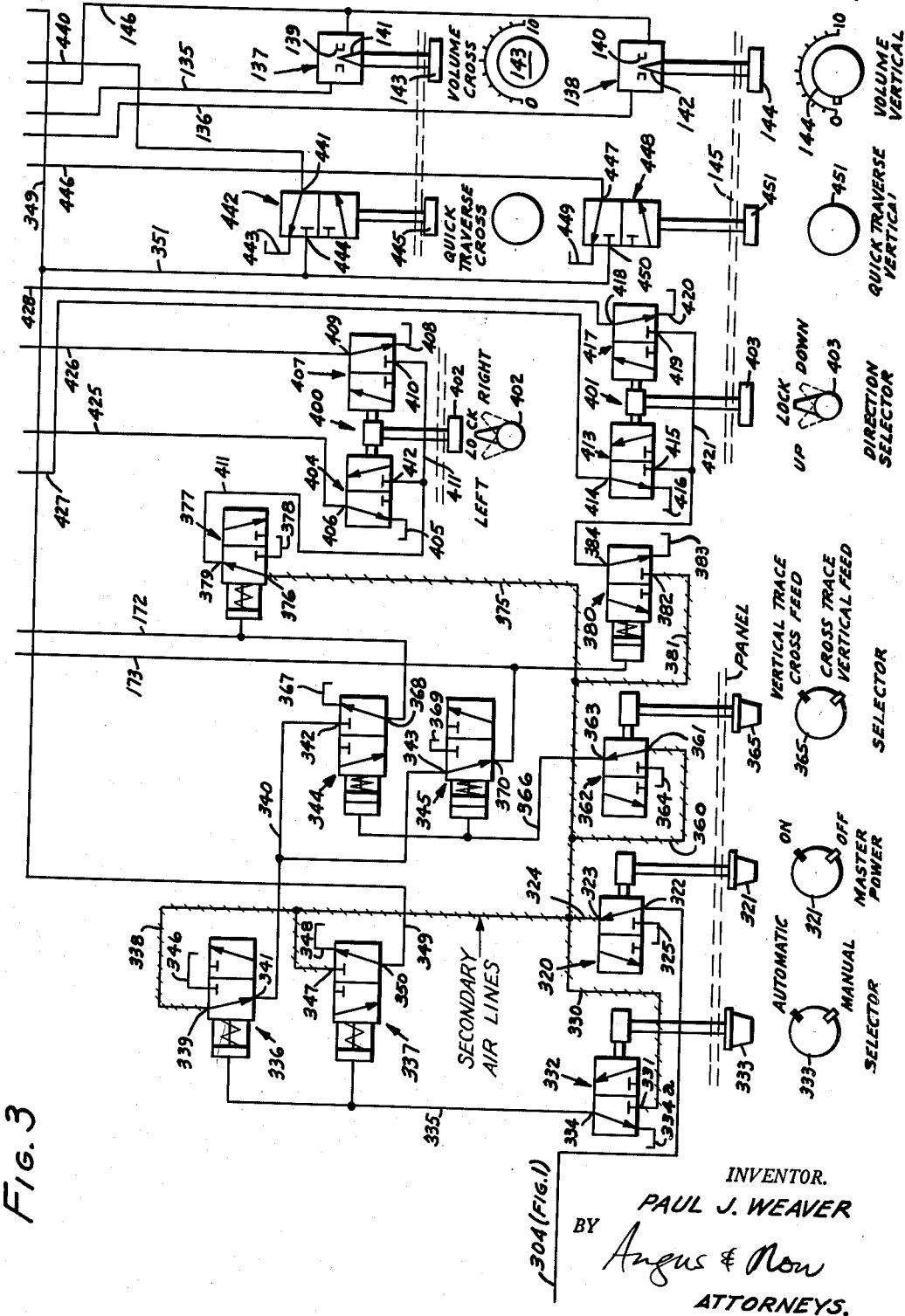
Fig. 3 is a similar drawing having its upper edge adapted to join to the lower edge of Fig. 2.

Conduits 135 and 136 respectively connect ports 232 and 239 of manifold 106a to valves 137, 138 (Fig. 3). These needle valves comprise orifices 139 and 140, and needles 141 and 142 in said orifices. The projection of the needles into the orifices, and therefore the orifice size, is adjusted by turning knobs 143 and 144 that are mounted to a control panel shown schematically by numeral 145. The outlets of both needle valves connect via conduit 146 to exhaust manifold 134.

A relief valve 150 (Fig. 1) which can be set to some desired value, is connected between exhaust manifold 134 and the reservoir via conduit 151. The relief valve provides a back-pressure control for maintaining pressure on the exhaust side of the system.

A feed range valve 152 which comprises an off-on valve with a pneumatic actuator 153 is connected in parallel with relief valve 150. Valve 152 is typical of a number of valves used in the system, and is illustrated in the standard JIC notation. An actuator is schematically shown as having a piston spring-biased to the normal position illustrated. This is the position a piston would assume if the actuator had no pressure thereon (the unactuated condition). Were pressure applied to the actuator, the actuator indication would show line 154 moved farther down, and spring 155 appearing more compressed. This is the actuated condition. Such actuation would transfer the valve condition. In this notation, the notations in the blocks would be exchanged.

Thus, valve 152 is shown as open to flow therethrough (the arrow indicating a fluid conduit) when the actuator is unactuated. When the actuator is actuated, the actuation in the blocks are exchanged. Then the arrow is in upper block 156, to which there are no fluid connections, and the lower block has the spaced-apart blocked-off terminals. The valve is therefore closed in the unactuated condition.

The hydraulic connections in the various manifolds will now be described, together with the valves which are mounted on the manifolds.

Manifold 109a (Fig. 2) is the base for valving that accomplishes tracer axis selection when the device is on automatic, and for lockout of the tracer valve when the tool is used as a conventional mill. Valve 109 comprises the manifold and four off-on valves 160, 161, 162, and 163, these valves all being normally closed when their actuators are unactuated, and open when their actuators are actuated, the reverse of valve 152. Valve 160 has ports 164 and 165 which are respectively connected to ports 113 and 107 of the manifold. Valve 161 has ports 166 and 167 which are respectively connected to ports 107 and 117 of the manifold. Valve 162 has ports 168 and 169 which are respectively connected to ports 112 and 108 of the manifold. Valve 163 has ports 170 and 171 which are respectively connected to ports 108 and 116 of the manifold. The actuators of valves 160 and 162 are both connected to a pneumatic signal line 172, and the actuators of valves 161 and 163 are both connected to pneumatic signal line 173.

Manifolds 103a and 104a are the bases for direction selector valves 103 and 104. Manifold 103a mounts four normally closed off-on valves 180, 181, 182, and 183, each of which has an actuator, and each of which valves is normally closed when the actuator is unactuated, and is opened to permit fluid flow when the respective actuator is actuated. Port 184 of valve 180 is connected both to port 185 of manifold 103 and to port 186 of valve 181. Port 187 of valve 180 is connected both to port 124 of the manifold and to port 188 of valve 182. Port 189 of valve 181 is connected to both port 125 of the manifold and to port 190 of valve 183. Port 191 of valve 182 is connected both to port 127 of the manifold and to port 192 of valve 183.

Manifold 104a similarly has four off-on valves 195, 196, 197, 198, all of which are the same as valve 180. Port 199 of valve 195 is connected both to port 200 of manifold 104a and to port 201 of valve 196. Port 202 of valve 195 is connected both to port 120 of the manifold and to port 203 of valve 197. Port 204 of valve 196 is connected both to port 121 of the manifold and to port 205 of valve 198. Port 206 of valve 197 is connected both to port 130 of the manifold and to port 207 of valve 198.

Manifold 106a is the base for mode selection valve 106. Valve 106 includes six off-on valves 220, 221, 222, 223, 224, and 225, all of which are like valve 180, each having an actuator, which when unactuated leaves the valve closed to fluid flow, and which when actuated opens the valve to fluid flow. Port 128 of manifold 106a connects to ports 226, 227 and 228 of valves 220, 221 and 222, respectively. Ports 229, 230 and 231 of valves 220, 221 and 222 respectively connect to ports 105, 133 and 232 of the manifold.

Manifold port 131 connects to ports 233, 234, and 235 valves 223, 224 and 225, respectively. Ports 236, 237, and 238 of valves 223, 224, and 225 respectively connect to ports 105, 133, and 239 of the manifold.

This completes the disclosure of the hydraulic connections in the control. There now remain to be described the pneumatic connections for setting the hydraulic valves to make the desired connections to the motors.

The pneumatic supply begins with a pneumatic supply panel 300, which is of conventional design. It includes an automatic water trap and filter 301, an oiler 302, and a pressure regulator 303. For this control, the pressure is ordinarily set at about 80 p.s.i.g. A primary air supply line 304 leaves the pneumatic supply panel carrying air under pressure, and supplies a rate control valve 305 through a conduit 306. Valve 305 may be a pressure-regulator which establishes an adjusted pressure in conduit 307. A gauge 308 is connected in conduit 307. Such gauge will serve as a direct reading of the adjustment of pressure-responsive motor 80.

Primary air supply line 304 is additionally connected to a range selector valve 310. This range selector valve is also shown in JIC notation, there being a control knob and shaft 311 mounted to the control panel, the dark indication 312 indicating that the device is set on high range. The light indication shows an alternate setting. With this setting, arrows 313 and 314 in the JIC notation are as illustrated. If the knob is turned to the alternate position, the arrows exchange blocks. The hook illustrated by 315 shows that port 316 of the valve is vented. Port 317 is connected to the primary air supply line.

In the adjustment shown, conduit 318 which is connected to port 319 of valve 310 is vented. If the control were moved to low range, arrows 313 and 314 would change blocks, symbolizing the closing off of the vent and the connection of ports 317 and 319, so that pressure is supplied to conduit 318. Conduit 318 connects to the actuator 153 of feed range valve 152.

Following primary pressure supply line 304 onto Fig. 3, it will be observed that this line terminates at a master power valve 320. This valve has a control knob 321 on the panel and is indicated in its "on" position as shown by the heavy shading. Valve 320 has an inlet 322 and an outlet 323. When the master power is on, the connection is as shown, whereby air is transmitted by the master power valve from primary supply line 304 through ports 322 and 323 to a secondary air line 324. With the knob turned to the alternate "off" position, the arrows reverse in the notation, so that line 324 is vented by vent 325.

The secondary air supply is indicated by cross-hatched lines in order to distinguish it from the primary air supply. Secondary air supply line 324 has a branch 330 which is connected to port 331 of automatic-manual selector valve 332. This valve has a knob 333 mounted to the panel, and the valve is shown in the automatic position. A vent 334a is provided. Port 334 of valve 332 is connected by conduit 335 to the actuators of a pair of valves 336 and 337.

Valve 336 serves as a tracer valve lockout, and valve 337 serves as a quick traverse and power feed lockout.

It will be observed that they are oppositely connected; that is, when their actuators are both deactuated, valve 336 is passing secondary air, while valve 337 is vented, and the situation is reversed when the actuators are actuated.

A branch 338 of the secondary air supply line connects to port 339 of valve 336. Conduit 340 interconnects port 341 of valve 336 with ports 342 and 343 of relay valves 344 and 345, respectively. Valve 336 includes a vent 346. Line 338 also connects to port 347 of valve 337, said valve also having a vent 348. Conduit 349 interconnects port 350 of valve 337 to a quick traverse signal line 351, and also to the actuators of valves 222 and 225.

Secondary air line 323 has another branch 360 which connects to port 361 of a tracer axis selector valve 362. Valve 362 also has a port 363 and a vent 364, as well as a knob 365 that is mounted to the panel. In the illustrated position, the device is set so that when the device is on "automatic," the vertical axis, that is, the axis controlled by motor 20, will be on tracer controlled movement, and the other axis, under the control of motor 21, will be set for feed movement. At such a setting, air under pressure is transmitted between ports 362 and 363 to conduit 366. Conduit 366 connects to the actuators of both relay valves 344 and 345. Valve 344 includes, besides its port 342, a vent 367 and port 368, while valve 343 includes a vent 369 and a port 370. It will be observed that valves 344 and 345 are reversely connected; that is, when both their actuators are unactuated, valve 344 is vented while valve 345 passes pressure from conduit 340. While with the actuators actuated, valve 344 passes pressure and valve 345 is vented. Therefore, when selector valve 362 is reversed, the signals in signal lines 172 and 173 are reversed.

It will further be observed that when the selector valve 332 is moved to its manual position, valve 336 is reversed from its present position so that conduit 340 is vented, whereupon regardless of the settings of valves 344 and 345, both signal lines 172 and 173 are vented, and tracer axis selector and lockout valve 109 has every one of its actuators deactuated. This will cut off all connections between the motors and the tracer valve. Relay valves 344 and 345 thereby convert the "automatic" command of valve 332 to actuation of appropriate valves for a given axis, while they are also responsive to a lockout command given by venting of valve 332.

Conduit 375 branches from secondary supply line 323 and connects with port 376 of valve 377. Valve 377 has a vent 378 and another port 379. The actuator of valve 377 is connected to signal line 172.

Another valve 380 is connected by a branch line 381 of the secondary air supply line to one of its ports 382. Valve 380 has a vent 383 and a port 384. Its actuator is connected to signal line 173. Valves 377 and 380 are provided for locking out manual selection of direction for an axis assigned to tracer control when on "automatic," and to permit manual selection of direction on both axes in both directions when the device is set for manual operation.

Direction selector valves 400 and 401 have knobs and shafts 402 and 403, respectively, mounted to the control panel. These are double-acting valves which, when in the central position illustrated in solid line, leaves valves on both sides of the actuator in their illustrated position. When the lever is moved to the left, the left-hand valve will be actuated so that the new valve condition would be illustrated by an exchange of arrows, while the other portion of the valve remains unchanged. Switching the knob over to the other side past neutral leaves the left-hand side in the unactuated condition illustrated, and actuates the right-hand section.

Direction selector valve 400 includes a first valve element 404 having a vent 405 and a port 406. A second valve element 407 has a vent 408 and ports 409, 410. Conduit 411 interconnects port 410 of valve element 407 and port 412 of valve 404 to port 379 of valve 377.

Direction selector valve 401 includes a first valve element 413 having ports 414 and 415, and a vent 416. A second valve element 417 includes ports 418 and 419, and a vent 420. Conduit 421 interconnects ports 415 and 419 of valve elements 413 and 417, respectively, to port 384 of valve 380.

Conduit 425 interconnects port 406 of valve element 404 to the actuators of valves 181 and 182. Conduit 426 interconnects port 409 of valve element 407 to the actuators of valve 180 and 183. Conduit 427 interconnects port 414 of valve element 413 to the actuators of valves 196 and 197. Conduit 428 interconnects port 418 of valve element 417 to the actuators of valves 195 and 198.

The pneumatic connections of the mode selection means will now be described. Signal lines 172 and 173 are respectively connected to the actuators of valves 220 and 223. Valves 220 and 223 switch an appropriate motor exhaust through section 29 of the tracer valve. The actuators of valves 222 and 225 are connected by conduit 349 to port 350 of valve 337. Valves 222 and 225 are connections between motor exhaust and needle valves 137 and 138, and relate to power feed.

The actuator of valve 221 is connected by a conduit 440 to port 441 of a quick traverse control valve 442. also includes a vent 443 and a port 444. This is preferably a push-type valve with a knob 445 mounted to the panel, whereby the valve is actuated so as to switch the position of the arrows when the knob is pushed. Port 444 is connected to quick traverse signal lines 351.

The actuator of valve 224 is connected by conduit 446 to port 447 of a quick traverse control valve 448 which is identical to valve 441. It includes a vent 449 and a port 450, and a knob 451 mounted on the panel. Port 450 is also connected to quick traverse signal line 351.

Valves 221 and 224 switch the appropriate exhaust from a motor under power control to by-pass the needle valves (sometimes called "volume control valves"). Venting of quick traverse signal line 351 (sometimes called "conduit 351") locks out quick traverse movement for the feed axis when on automatic. If desired, this quick traverse could be provided by disconnecting line 351 from valves 442 and 448, and connecting ports 444 and 450 to the secondary air line. Then quick traverse could be achieved at any time.

*Operation*

The operation of this device will first be described in connection with the settings of the controls as indicated. With this arrangement, the master switch 320 is turned on, selector 332 is turned so that the device is made automatic, the trace axis selector valve is adjusted so that the vertical axis is under tracer control, and the cross-feed is under feed rate control and the direction selectors 400 and 401 are set so that all their valve elements are unactuated.

With this arrangement, motor 20 will operate to move the worktable vertically until the stylus of the tracer valve just contacts the template. Because the direction selectors are set at "lock," there will be no feed movement.

With master power valve 320 set to the condition shown, compressed air is supplied from the primary air line to the secondary air line. This makes air available to valves 332, 320, 362, 380, 336, 337, and 377. With selector 332 set for "automatic" as shown, conduit 335 is vented so that tracer valve lockout valves 336 and 337 are as shown.

Valve 336 transmits compressed air through conduit 340 to relay valves 344 and 345. Because valve 362 is adjusted by knob 365 to the position shown, compressed air is transmitted to conduit 366. The actuators of both valves 344 and 345 are actuated. Signal line 172 is vented by vent 367. Pressure from conduit 340 is transmitted by valve 345 to relay line 173. Tracing relay line 173 into Fig. 2, it will be observed that pressure is then applied to the actuators of valves 161 and 163 as well as to the actuator of valve 220 in mode selector valve 106.

Actuation of valves 161 and 163 causes these valves to open to the flow of fluid. Valves 160 and 162 remain closed, because their actuators are unactuated from vented signal line 172. Conduits 32 and 33 are now connected via valves 163 and 161, respectively, to ports 116 and 117, respectively, which are in turn connected to conduits 114 and 115 which feed the opposite sides of motor 20. Lines 32 and 33 are the motor supply conduits of the tracer section of the tracer valve, so that this adjustment of the relay valves has caused the tracer section of the tracer valve to be connected to motor 20.

Pressure in signal line 173 causes valve 380 to remain connected to its vent 383, thereby venting conduit 421. Therefore, regardless of the setting of direction selector valve 401, no signal can be produced by it. Direction selector valve 401 is the direction control selector for the vertical axis, and it will be seen that it is now locked out by the setting of valve 380.

On the other hand, signal line 172 is vented, and therefore the actuator of valve 377 remains unactuated. Then pressure from secondary air line 375 is transmitted by valve 377 to conduit 411 which applies pressure to ports 410 and 412 of valve elements 407 and 404, respectively, in direction selector 400. It will now be seen that a pressure signal can be applied to ports 406 and 409 of elements 404 and 407, respectively, upon appropriate movement of knob 402.

Valves 377 and 378 have therefore served to selectively lock out the direction selector which relates to the axis under tracer control.

Following conduits 425 and 426 from direction selector valve 400 into Fig. 2, it will be noted that these respectively connect to the actuators of valves 181 and 182, and 180 and 183. The actuation of knob 402 in one direction or the other will thereupon cause a signal to be applied either to conduit 425 or to 426, which will actuate and therefore close either valves 181 and 182 or valves 180 and 183, respectively.

If movement to the right is desired, the knob will be turned to the right, and pressure will be applied to conduit 426. If so, then valves 180 and 183 will close, and it will be observed that pressure from conduit 102 at port 185 of manifold 103a is transmitted through valve 180 to port 124 of the manifold. From this port it passes through conduit 122 to conduit 110 that connects with one side of the motor which tends to move the table to the right. Closing valve 183 causes conduits 111 and 123 to be connected from manifold port 125 through the valve to port 127 of the manifold, from which it proceeds to conduit 126 to the mode selector valve. It will thereby be seen that pressure from conduit 102 has been directed by the direction selector valve to the proper side of the appropriate motor, and that the exhaust has been provided to the mode selector valve 106.

Pressure in signal line 173 will have actuated the actuator of valve 220 and close the same so that exhaust from conduit 126 which enters port 128 will pass through valve 220 and exit through port 105 to conduit 50 which is connected to the feed rate control section of the tracer valve. This means that the exhaust from the motor under feed control is directed through the rate control section of the tracer valve.

Incidentally, if feed rate control is not provided for in the tracer valve structure, port 105 could simply be connected to conduit 134 instead, and a constant feed rate would be achieved.

Should it be desired to transfer the valving and make the cross-axis under tracer control and the vertical axis under feed control, then selector 362 would be transferred so as to vent conduit 366, thereby reversing the settings of relay valves 344 and 345. Then, pressure would have been "on" in signal line 172 and "off" in signal line 173, whereupon valves 161 and 163 would be opened, while at the same time, valve 223 would be open so as to conduct the exhaust from direction selection valve 104 to the feed rate control section of the tracer valve.

At the same time, the settings of valves 377 and 380 would have been reversed, and direction selector 400 would have been locked out, while direction selector 401 would have been rendered operable, so that signals could be provided to direction selection valve 104 instead of to valve 103.

If, in the first example, movement to the left had been desired, it would only have been necessary to apply pressure in signal line 425 instead of in line 426, closing valves 181 and 182 instead of valves 180 and 183, whereupon pressure from conduit 102 through port 185 would have been transmitted through valve 181 to conduits 123 and 111, while exhaust from the motor would have been transmitted by conduits 110 and 122 through valve 182 to port 127 and out conduit 126. Similar considerations relate to direction selection valve 104, the conduits 126 and 129 exactly corresponding for the different axes.

The above is believed to be adequate to describe the automatic operation of the machine tool.

Now if it is desired to operate the machine manually as a conventional mill, selector 332 is actuated by turning selector knob 333 to its manual setting so that pressure is supplied to conduit 335. Valve 336 will thereupon vent conduit 340 by shutting off the connection between ports 339 and 341, and connecting port 341 to vent 346, so that ports 342 and 343 of valves 344 and 345 will be vented. It will be observed that vents 367 and 369 are also provided so that no matter what arrangement is made of selector 362, no signal can be provided to either of signal lines 172 and 173. Therefore, tracer axis selection and lockout valve 109 is locked out, in that every one of the actuators will remain unactuated in this setting. Closure of valve 109 thus cuts off any connections to the tracer control section. Also, the actuators of valves 220 and 223 will remain unactuated so that it will be impossible for any of the motor exhausts to be passed to the rate control section 29 of the tracer valve. The tracer valve is thereby completely removed from the motor circuits.

Pressure actuation of valve 337 to the right from the Fig. 3 position places conduit 349 under pressure. Following conduit 349 into Fig. 2, it will be seen that this actuates the actuators of valves 222 and 225, thereby opening the same. This signal opens valves 222 and 225 to fluid flow so that exhaust reaching mode selector valve 106 from conduits 126 and 129 is respectively connected to conduits 135 and 136, which make respective connections with volume control valves 137 and 138 (Fig. 3). Both of these volume control valves discharge to conduit 146 which joins conduit 134 in Fig. 2, which can be traced into Fig. 4 where it discharges into the hydraulic power supply. The volume controls are intended to limit the rate of movement of the device when manually controlled by restricting the rate of flow of exhaust fluid from the motors.

A primary control on the overall rate of the system is the relief valve 150. In the event that a higher feed range is desired than is provided by valve 150, the range selector 310 may be set as shown in Fig. 4, by opening valve 152 and providing a second route for the exhaust to the reservoir. This enables a greater volume per unit time to pass through the system. For low range, shaft 311 is turned, changing the setting of range selector valve 310, disconnecting port 319 from vent 315 and connecting it to port 317, thereby putting air pressure into conduit 318. This actuates feed range valve 152, thereby opening the same so that all exhaust must pass through the relief valve at higher pressure, thereby lowering the rate.

The fact that signal lines 172 and 173 are vented means that both valves 377 and 380 are unactuated, and are therefore connected to the secondary supply line, and pressure is supplied to both conduits 411 and 421 so that full directional control can be exerted by the two selector valves 400 and 401, which are applied through the direction selection valves 103 and 104. In this case, fluid under pressure is supplied to ports 185 and 200 of valves 103 and 104 from which it is directed to the appropriate sides of the respective motors through the respective conduits. It will be seen that valves 180, 181, 195, and 196 control the selection of the side of the motor to be placed under pressure, while valves 182, 183, 197, and 198 connect to the exhaust side, and send the exhaust fluid through conduits 126 and 129, as appropriate.

Should quick traverse movement be desired, it is accomplished by bypassing volume control valves 137 and 138. This is done by pressing the knob of the appropriate valve 442 or 448. When the device is set for "manual," pressure is supplied to quick traverse signal line 359, and when the respective ones of the quick traverse buttons are pressed, then pressure is passed by these valves to conduits 440 and 446. These conduits can be traced into Fig. 2, and it will be seen that they respectively actuate the actuators of valves 221 and 224, thereby connecting the exhaust from conduits 126 and 129, respectively, through these valves and out port 133 to conduit 132 and exhaust 134. Quick traverse therefore involves the bypassing of the volume control valves 137 and 138, which volume control valves are the rate restraint on the device when it is operating manually.

The rate of fluid flow through the tracer valve can be adjusted by the rate control valve 305 which sends a regulated pressure to motor 80 in the tracer valve, thereby turning the spool in the sleeve to an appropriate rotary position.

This invention provides a completely flexible system which adapts a conventional milling machine for both automatic tracer-controlled movement with a coordinated feed rate, or a conventional power-operated movement, or a quick traverse movement. The device is entirely foolproof, having included therein a number of lockouts which prevent improper operation of the tool.

Furthermore, it is possible to carry this out in a completely cylinder-equipped device wherein screws need not be required. Tests have shown that by quickly manipulating the direction selector valves, adjustments of slide positions as small as $10^{-5}$ inch are attainable.

This invention is not to be limited to the embodiment shown in the drawings and described in the description which is given by way of example and not of limitation, but only in accordance with the scope of the appended claims.

I claim:

1. A control for directing and regulating the transmission of hydraulic power to motors for causing a relative shifting movement of a machine tool element along a pair of non-parallel axes, comprising: a tracer valve adapted to pass hydraulic fluid to either side of a selected one of said motors so as to reversibly move the member along one of said axes in a reversible tracer movement in accordance with a command; direction selector means connected to each motor adapted to select the direction the respective motor is to move the element along its respective axis; lockout means for each of said direction selector means connected to disable the one of said direction selector means connected to the motor under control of the tracer valve when the tracer valve controls one of said motors; a tracer axis selector adapted to connect the tracer valve to either one of said motors and simultaneously cause the lockout means connected to the same motor to lockout the respective direction selector means, and connect the direction selector of the other motor to a source of pressurized hydraulic fluid so as to enable said other motor to move the elements in a feed movement; mode selector means having a pair of control conditions, a first of said conditions causing both lockout means to enable their respective direction selector means to be effective simultaneously on their respective motors, the other of said control conditions causing the tracer valve to be connected to one or the other of the motors, and the other of said motors to be connected to a source of pressurized hydraulic fluid, and to operate on that one of the lockout means which is connected to the motor controlled by the tracer valve to disable its respective direction selector means, the first condition thereby causing a tracer-controlled combined tracer and feed movement of the element, and the second condition permitting a selectively directible manually controlled movement of the elements along the individual axes upon manipulation of the respective direction selector means.

2. Apparatus according to claim 1 in which a volume control valve is connectible to the exhaust side of each motor by the mode selector in its second condition, so that exhaust fluids from the motors pass through the respective volume control valves to reservoir, and in which the mode selector includes a quick traverse valve connectible between the exhaust side of each of the motor and the reservoir, bypassing the volume control valve, and manipulable means operable to open said quick traverse valve so as to make said bypass connection.

3. Apparatus according to claim 2 in which the exhausts from the quick traverse valves and from the volume control valves are connected to a reservoir through a relief valve, and through a feed range valve, which is an open-closed valve, in parallel with the relief valve, and in which means are provided for opening the tracer feed range valve to provide a second connection to the reservoir, whereby the back pressure on the exhaust is lowered and the rate of flow is enabled to be increased.

4. Apparatus according to claim 1 in which the tracer valve includes a tracer section for controlling said reversible tracer movement, and also a feed rate control section connected to the exhaust passed by that portion of the movement selector which receives exhaust from the motor on feed movement when the mode selector is in its first condition, said feed rate control section restricting the flow of hydraulic fluid therethrough to a rate which is inversely proportional to the rate of flow through the tracer section.

5. Apparatus according to claim 1 in which a tracer axis selection and lockout valve is provided which comprises valves selectively connectible between a selected one of the motors and a tracer section of the tracer valve, said valves being actuable by the same means as the lockout means operable on the direction selector means.

6. Apparatus according to claim 5 in which there are four open-closed valves in said tracer axis selection and lockout valve, said four valves being connected in pairs to ports of the tracer valve, and individually to opposite sides of the motors, whereby opening of one of said pairs of valves connects the two ports of the tracer valve to opposite sides of a respective one of said motors.

7. Apparatus according to claim 6 in which the mode selector means includes a pair of open-closed valves, each respectively actuable with one of said pairs in the tracer axis selection and lockout means whereby upon connecting one of said motors to the tracer section of the tracer valve, the one of said last-named valves associated with the other motor interconnects the exhaust side of said motor to the feed rate control section of the tracer valve.

8. Apparatus according to claim 7 in which a volume control valve is connectible to the exhaust side of each motor by the mode selector means in its second condition, so that exhaust fluids from the motors pass through the respective volume control valves to reservoir, and in which the mode selector means includes a quick traverse valve connectible between the exhaust side of each of the motor and the reservoir, bypassing the volume control valve, and manipulable means operable to open said quick traverse valve so as to make said bypass connection.

9. Apparatus according to claim 8 in which the exhausts from the quick traverse valves and from the volume control valves are connected to a reservoir through a relief valve, and through a feed range valve, which is an open-closed valve, in parallel with the relief valve, and in which means are provided for opening the tracer feed range valve to provide a second connection to the reservoir, whereby the back pressure on the exhaust is lowered and the rate of flow is enabled to be increased.

10. Apparatus according to claim 9 in which a pressure-responsive motor is connected to said tracer valve for adjusting orifices therein and thereby exerting a control over tracer and feed rates, and in which means are provided for adjusting the pressure supplied to said pressure-responsive motor.

No references cited.

UNITED STATES PATENT OFFICE
CERTIFICATE OF CORRECTION

Patent No. 2,984,073                                           May 16, 1961

Paul J. Weaver

It is hereby certified that error appears in the above numbered patent requiring correction and that the said Letters Patent should read as corrected below.

Column 4, line 41, for "Th" read -- The --; column 6, line 14, after "235" insert -- of --; column 8, line 27, before "also" insert -- Valve 442 --.

Signed and sealed this 5th day of June 1962.

(SEAL)
Attest:

ERNEST W. SWIDER                                      DAVID L. LADD
Attesting Officer                                        Commissioner of Patents